United States Patent [19]

Shibata et al.

[11] Patent Number: 4,860,601
[45] Date of Patent: Aug. 29, 1989

[54] APPARATUS FOR DETERMINING A ROTATION CENTER OF A ROTATING BODY

[75] Inventors: Hiroki Shibata; Atsushi Toda; Kazuki Takahashi; Kiyoshi Wada, all of Shizuoka, Japan

[73] Assignee: Koito Manufacturing Co., Ltd., Tokyo, Japan

[21] Appl. No.: 217,062

[22] Filed: Jul. 5, 1988

Related U.S. Application Data

[63] Continuation of Ser. No. 2,947, Jan. 13, 1987, abandoned.

[30] Foreign Application Priority Data

Jan. 14, 1986 [JP] Japan .................................. 61-4352
Jan. 14, 1986 [JP] Japan .................................. 61-4353
Sep. 26, 1986 [JP] Japan ................................ 61-225795

[51] Int. Cl.$^4$ ............................................. B60Q 1/00
[52] U.S. Cl. ..................................... 73/865.8; 362/42
[58] Field of Search ........................... 73/118.1, 865.8; 364/424, 559; 362/37, 40–60; 377/45, 29; 340/52 R, 686

[56] References Cited

U.S. PATENT DOCUMENTS

| | | | |
|---|---|---|---|
| 3,936,071 | 2/1976 | Ricketts, Jr. et al. | 340/686 |
| 4,007,357 | 2/1977 | Yanagishima | 340/52 R |
| 4,060,242 | 11/1977 | Huang et al. | 377/45 |
| 4,265,395 | 5/1981 | Sumikawa et al. | 377/45 |
| 4,333,071 | 6/1982 | Kira et al. | 315/81 |
| 4,340,928 | 7/1982 | Hohmann, Jr. | 362/49 |
| 4,476,529 | 10/1984 | Nakamura et al. | 180/142 |
| 4,566,710 | 1/1986 | Furukawa et al. | 180/140 |
| 4,573,107 | 2/1986 | Stock et al. | 362/49 |
| 4,633,709 | 1/1987 | Numata et al. | 364/424 |
| 4,638,290 | 1/1987 | Wagner | 340/56 |
| 4,733,333 | 3/1988 | Shibata et al. | 362/40 |

Primary Examiner—Stewart J. Levy
Assistant Examiner—Robert R. Raevis
Attorney, Agent, or Firm—Blakely, Sokoloff, Taylor & Zafman

[57] ABSTRACT

An apparatus for determining a rotation center of a rotary body comprises a rotary body rotating in clockwise and counterclockwise directions in cooperation with the steering for a vehicle, and original position detecting circuit which detects a predetermined original angular position which the rotary body taken per each rotation, thus judging an original angular position taken when other original angular positions are not detected within a lapse of a predetermined time after the original angular position has been detected as rotation centers in the clockwise and counterclockwise directions of the rotary body.

1 Claim, 8 Drawing Sheets

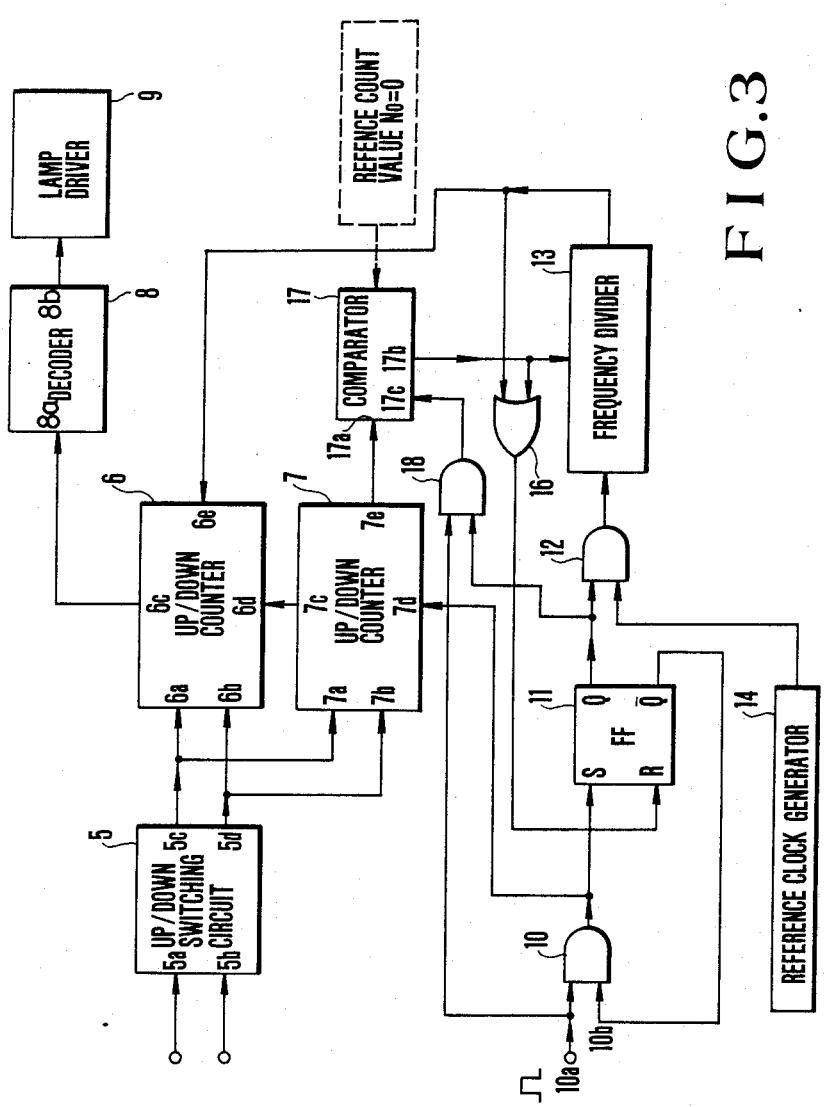

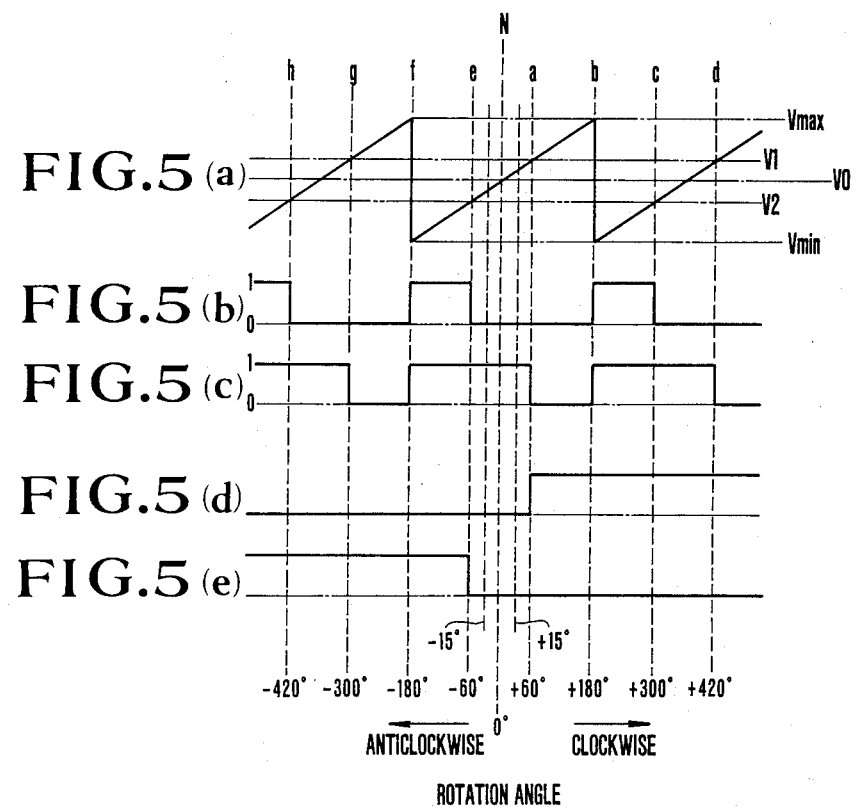

APPARATUS FOR DETERMINING A ROTATION CENTER OF A ROTATING BODY

This is a continuation of application Ser. No. 002,947, filed Jan. 13, 1987, now abandoned.

BACKGROUND OF THE INVENTION

The present invention relates to an apparatus for determining a rotation center of a rotary body, and more particularly to an apparatus for determining a rotational angular center of a rotary body rotating in cooperation with steering wheel for an automotive venhicle and the like.

Hitherto, in vehicles including automotive vehicles a rotary disk which rotates in cooperation with the steering wheel is provided. A plurality of slits are provided an equiangular distance in the rotary disk, and two photo-interrupters are disposed closely to the rotary disk to face the slits. A light passing through the slit is detected by the photo-interrupters, thereby information relating to the steering is obtained and used to conduct various controls. Namely, the two photo-interrupters produce pulse like electric signals which are the same in the waveform but nearly 90 degrees out of phase from each other. The electric signals are counted to detect a rotational direction and a rotational angle of the steering wheel.

However, there is no means to correct an error in such a conventional rotational angular detector, in such a case that an erroneous count occurs in the counter due to electric noises etc., resulting in the problem that the system erroneously operates according as the errors are accumulated. Moreover, when there is employed a power cut off method in which the power feed to the rotation angular detector is cut off after the power supply is switched off in order to lessen power consumption, a change of an angular position of the steering wheel until the ignition switch is turned on next time results in an error and such errors are accumulated.

In addition, since the rotational angle detector produces same output value per each 360 degrees rotation of the steering wheel in clockwise and counterclockwise directions, it is impossible to discriminate between the steering angular position when the vehicle advances in a beeline and a steering angular position after the steering wheel has made one revolution, resulting in the possibility that the various controls are erroneously conducted.

SUMMARY OF THE INVENTION

An object of the present invention is to provide an apparatus for determining a rotational angular center of a rotary body which eliminate drawbacks of the above-mentioned prior arts, and which precisely operates even when the noise occurs or it is reoperated after the power supply switch has been cut off.

Another object of the present invention is to provide an apparatus which can determine a precise angular position of a steering wheel when the automobile is traveling in a straight line.

A device for determining a rotational angular center of a rotary body, the rotary body having a rotational angular position defined to be a rotational angular center, the rotary body being free to rotate through the same amount on both the clockwise and counterclockwise sides of the rotational angular center, comprises: a sensor for sensing the rotation of the rotary body; a counter for inputting an output from the sensor to respectively increment and decrement counts according to the clockwise and counterclockwise rotations of the rotary body through a complete revolution; a first decoder for decoding a count value output from the counter to output the decoded count value as rotational angular information; a second decoder provided with a first output terminal and a plurality of secondary output terminals for decoding the count value output from the counter to output the decoded count value thereof from the first output terminal and the secondary terminals, the decoded count value being output on one of the secondary terminals when the output from the counter is different from zero; and a logic circuit which is inoperative when a signal output of high level appears at the first output terminal and which produces a signal for resetting the counter when a logic signal output appears at any one of the secondary output terminals.

BRIEF DESCRIPTION OF THE DRAWINGS

FIG. 3 is a block diagram illustrating another embodiment according to the present invention, FIGS. 4, 4A, 4B, 4C, and 4D are block diagrams illustrating a further embodiment according to the present invention, and FIGS. 5(a) through 5(e) are timing charts for explaining the operation of the circuit shown in FIG. 4.

DETAILED DESCRIPTION OF PREFERRED EMBODIMENTS

Figure 1:
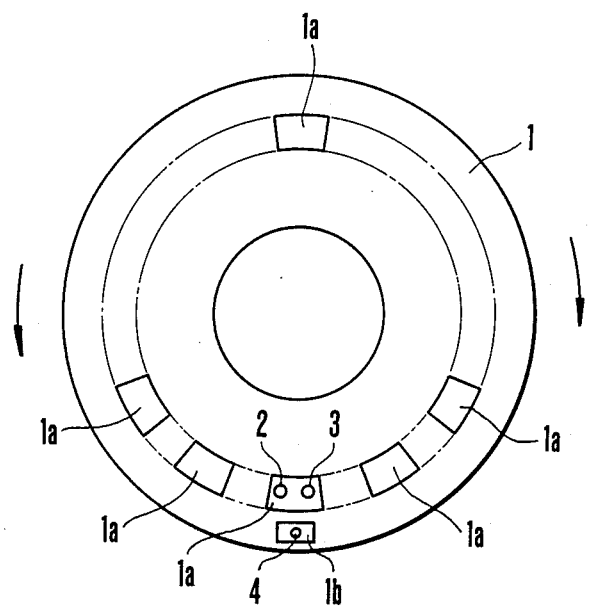
FIG. 1 is a view for explaining a rotational angular position sensor.
Figure 2:
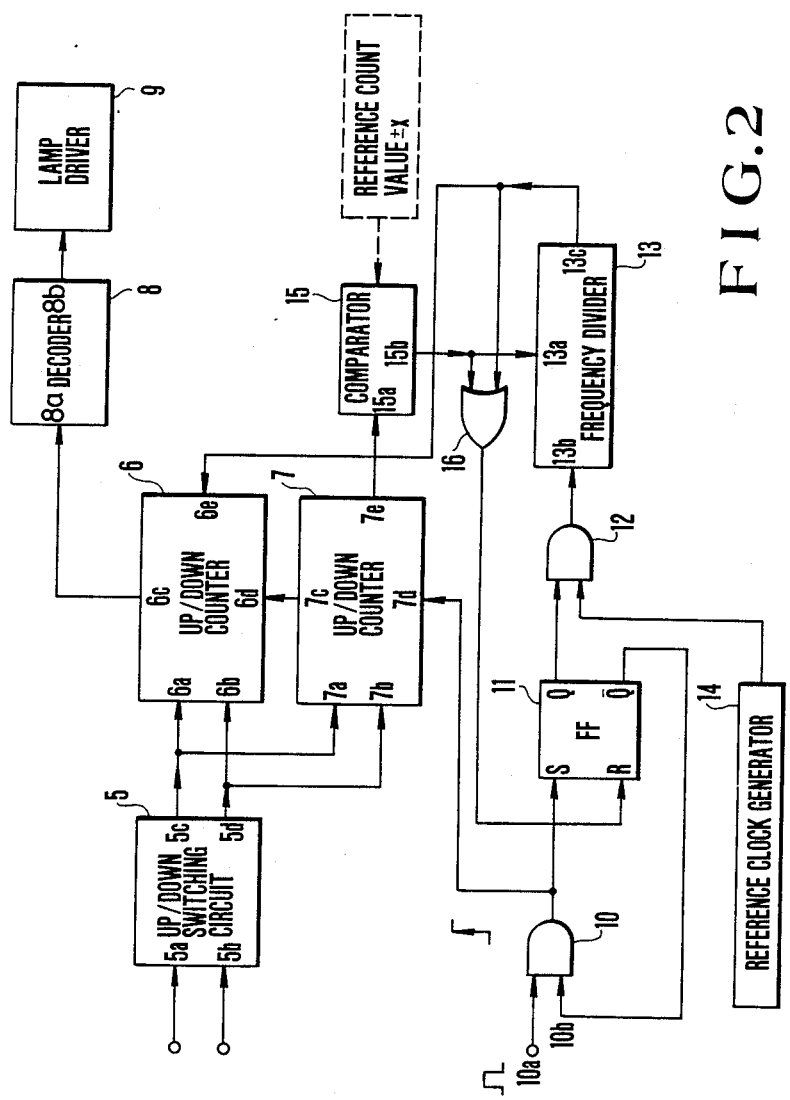
FIG. 2 is a block diagram illustrating an embodiment according to the present invention.
Figure 4A:
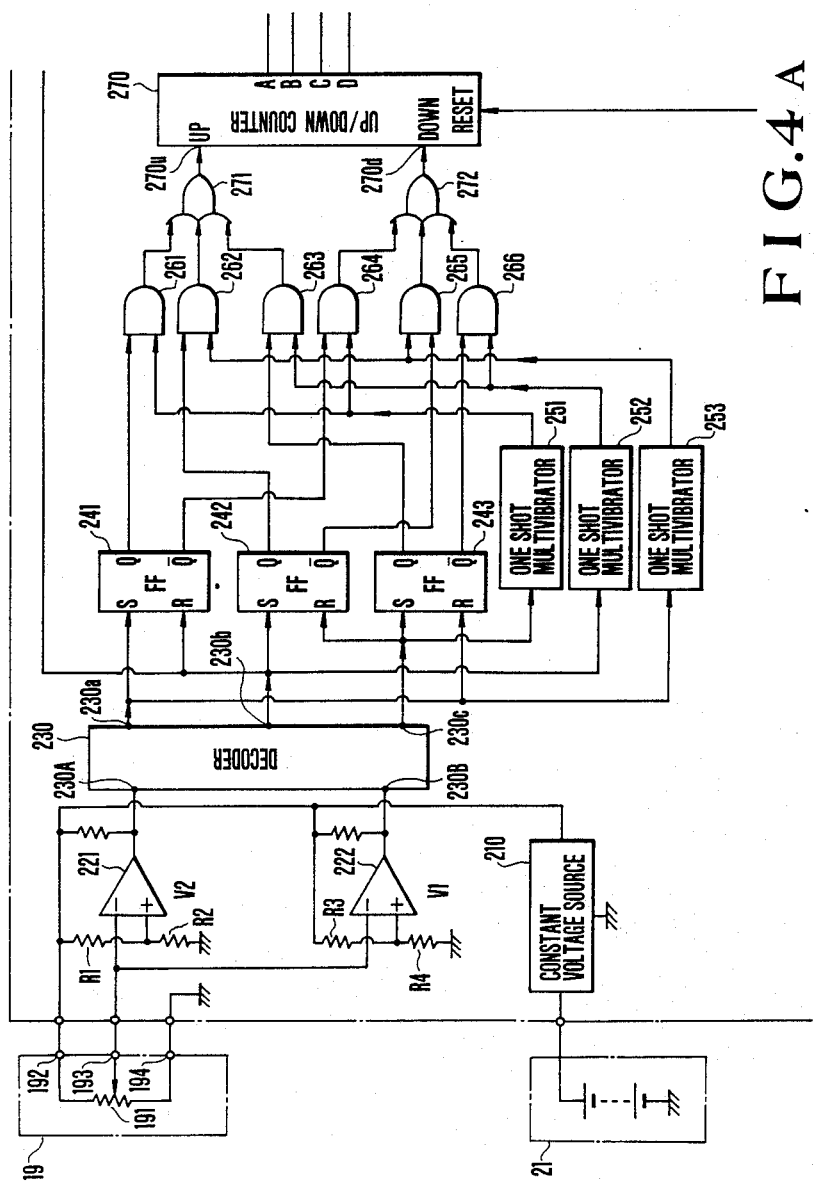
Figure 4B:
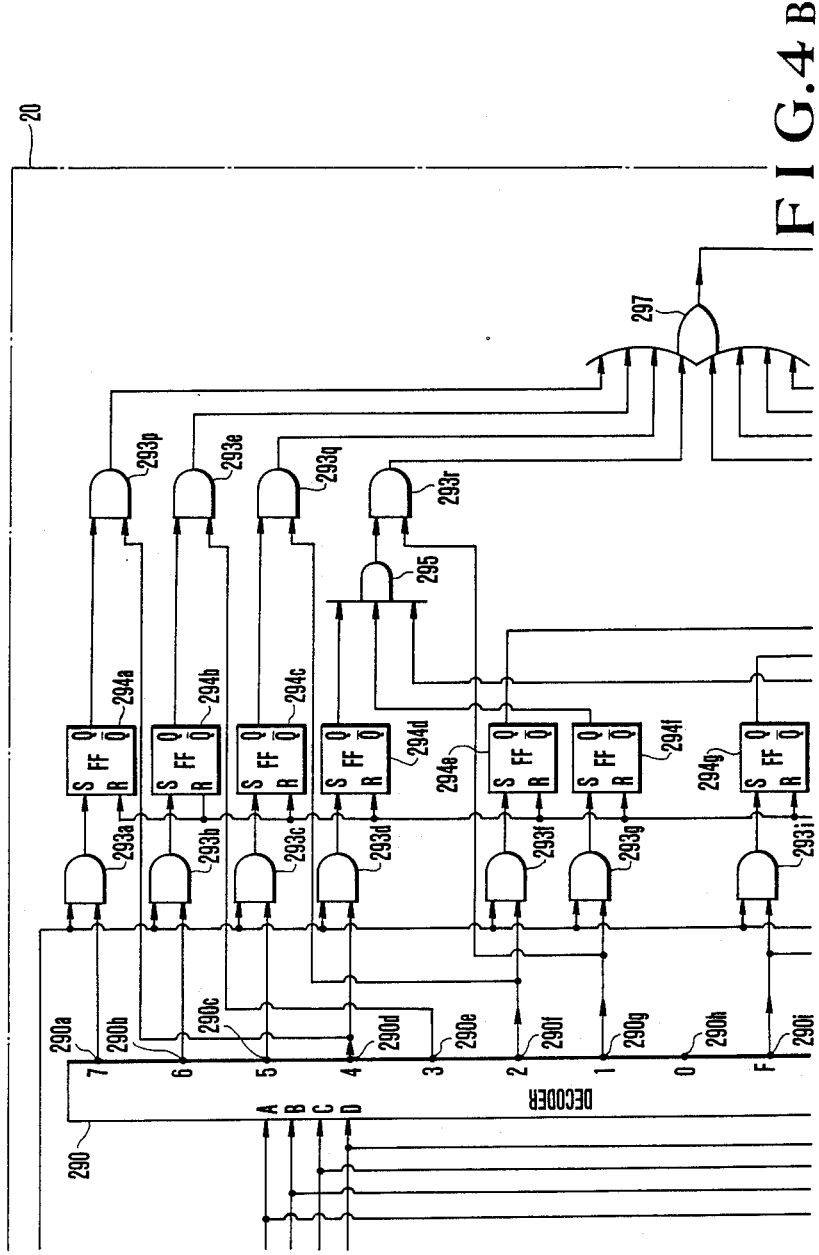
Figure 4:
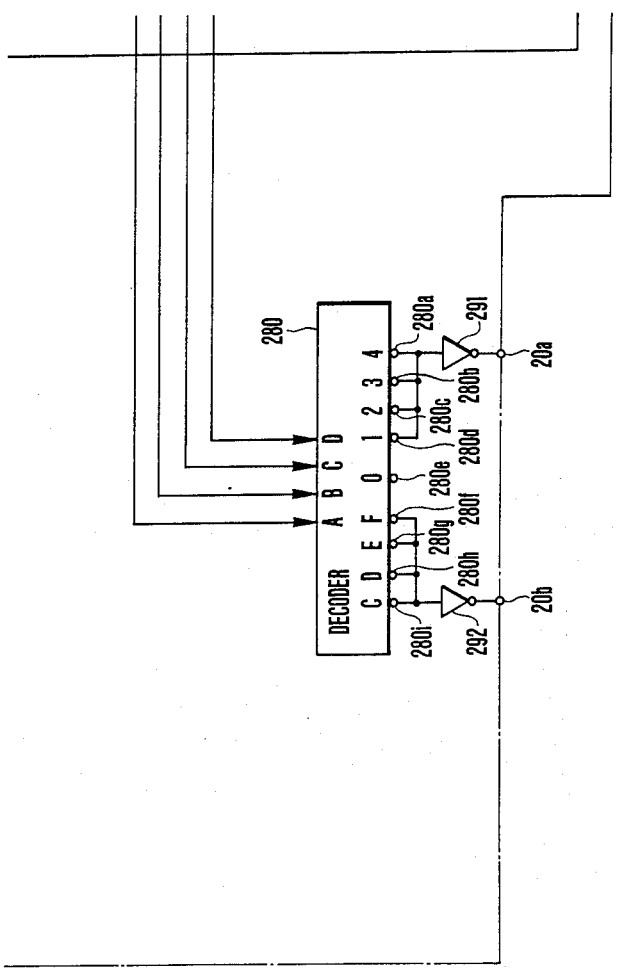
Figure 4D:
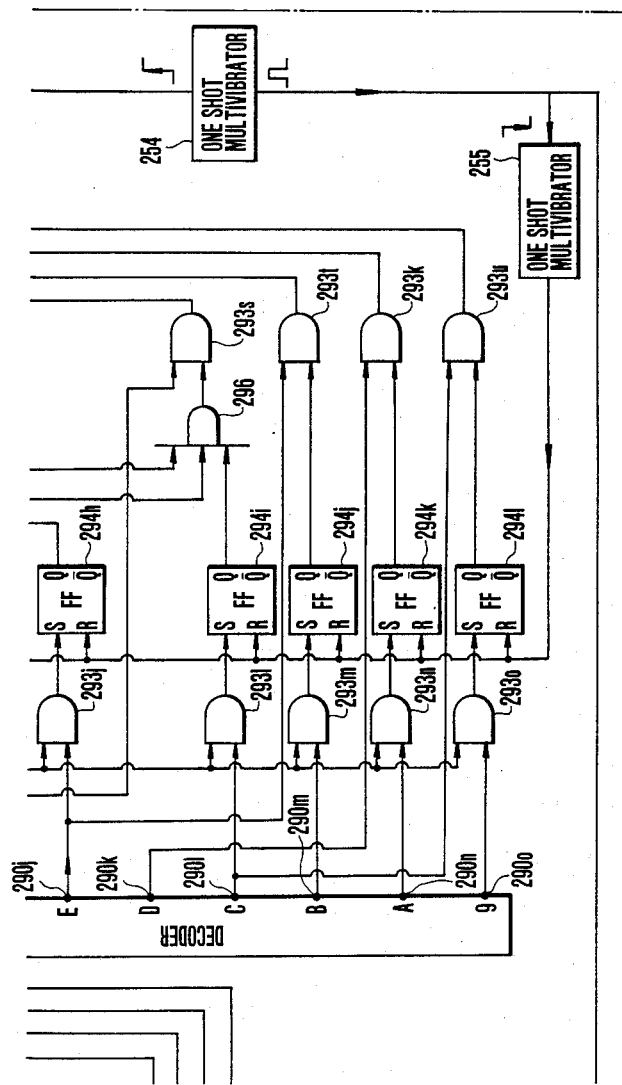

FIG. 1 shows a rotational angular position sensor rotating in cooperation with a steering wheel for a vehicle. This position sensor is composed of a rotary disk 1 rotating in cooperation with the steering wheel, and photo-interrupters 2, 3 and 4 each comprising a light emitting element and a light receiving element. The photo-interrupters 2 and 3 are adjacently disposed at the passing position of slits 1a which are opened at an equiangular distance in the outer peripheral portion of the rotary disk 1 in the same form. These photo-interrupters 2 and 3 produce pulse like electric signals which have the same waveform and nearly 90 degrees out of phase according as the slits 1a pass by the rotation of the rotary disk 1. Such pulse like electric signals are input to an UP/DOWN switching circuit 5 (FIG. 2). In the outer peripheral surface at a predetermined rotational amngular position of the rotary disk 1, a slit 1b for detecting an original position is independently provided. The photo-interrupter 4 detects passing of the slit 1b.

The relationship between the rotary disk 1 and the photo-interrupter 4 is set in a manner that the slit 1b and the photo-interrupter 4 are opposite to each other at an angular position of a steering wheel (which will be called a "steering center" hereinafter) when a vehicle advances in a beeline. A rotational angular position of the rotary disk 1 such that the photo-interrupter 4 is opposite to the slit 1b will be called an "original position" of the rotary disk 1 or the steering wheel hereinafter. Further, an original position at the steering center (i.e. advancing in a beeline) will be called a "rotation center" hereinafter. Namely, everytime the steering wheel makes one rotation in clockwise and anticlockwise directions with the steering center being as the center, the original position of the rotary disk 1 which has been shifted by an angle of 360 degrees is detected. Since a steering wheel for an automotive vehicle is generally constituted so that it can make a rotation less than two rotations in respective clockwise and anticlockwise directions with the steering center being as the center, three original positions, i.e., the original position of the rotation center and those in the right and left directions, are detected by the photo-interrupter 4 and an original position detection signal at each of that times is then output.

FIG. 2 is a block diagram illustrating an embodiment of an apparaus for determining a rotation center of a steering wheel according to the present invention. In FIG. 2, output signals from the photo-interrupters 2 and 3 of the rotational angular position sensor shown in FIG. 1 are input to input terminals 5a and 5b of UP/DOWN switching circuit 5. The UP/DOWN switching circuit 5 inputs pulse like electric signals from the rotational angular position sensor to output up and down signals numbers of which correspond to amounts of clockwise and counterclockwise steerings, respectively. Output terminals 5c and 5d of the UP/DOWN switching circuit 5 are connected to input terminals 6a and 7a of an UP/DOWN counters 6 and 7 and input terminals 6b and 7b thereof, respectively. The UP/DOWN counters 6 and 7 effect up or down count by the number of up or down signals input, respectively. Namely, when the rotary disk 1 is positioned at the rotation center, the count value of the UP/DOWN counter 6 is set to zero. By the clockwise steering, its count value increases one by one, and by the counterclockwise steering, its count value decreases one by one.

An output terminal 6c of the UP/DOWN counters 6 is connected to an input terminal 8a of a decoder 8. An input terminal 6d of the UP/DOWN counter 6 is connected to one output terminal 7c of the UP/DOWN counter 7. When the UP/DOWN counter 6 inputs a load signal from a load terminal 6e, it takes in a count value of the UP/DOWN counter 7 at that time through the input terminal 6d in accordance with the load signal at the load terminal 6e, to replace the content of its count value with the input to the input terminal 6d. The decoder 8 selects its own output terminals (not shown) corresponding to the output of the UP/DOWN counter 6 to set each of levels of the output terminals to low ("L") or high ("H"). An output terminal 8b of the decoder 8 is connected to an input terminal of a lamp driver 9 which varies irradiation direction of a head lamp (not shown) in accordance with an output signal from the decoder 8. An output terminal 7e of the UP/DOWN counter 7 is connected with an input terminal 15a of a comparator 15. To the comparator 15, count values $\pm\chi$ corresponding to rotational angular position of $\pm 180$ degrees when the rotation center of the rotary disk 1 is taken as a reference are set in advance as reference count values. An output terminal 15b of the comparator 15 is connected to an input terminal 13a of a frequency divider 13 and to one input terminal of an OR circuit 16. When a count value of the UP/DOWN counter 7 is not within the count values of $\pm\chi$, the comparator 15 outputs a reset signal to the frequency divider 13. An output terminal 13c of the frequency divider 13 is connected to the load input terminal 6e and to the other input terminal of the OR circuit 16.

On the other hand, one input terminal 10a of an AND circuit 10 is connected to the photo-interrupter 4 shown in FIG. 1. To this input terminal 10a, an original position detection signal which goes "H" when the original position is detected is delivered. An output terminal of the AND circuit 10 is connected to a reset terminal 7d of the UP/DOWN counter 7 and to a set (S) terminal of a R-S flip-flop 11. When the output level of the AND circuit 10 goes "H", the count value of the UP/DOWN counter 7 is reset and is returned to zero. The R-S flip-flop 11 has a output terminal connected to the other input terminal 10b of the AND circuit 10, a reset (R) input terminal connected to an output terminal of the OR circuit 16, and a output terminal Q connected to one input terminal of the AND circuit 12. To the other input terminal of the AND circuit 12, an output clock pulse signal from a reference clock generator 14 is input. An output terminal of the AND circuit 12 is connected to an input terminal 13b of the frequency divider 13.

A clock pulse signal passing through the AND circuit 12 is input to the frequency divider 13. The frequency divider 13 overflows whenever the clock pulse signal continues to be input for more than 30 seconds. As described above, when this load signal is input to the input terminal 6e, the UP/DOWN counter 6 takes in a count value of the UP/DOWN counter 7 at that time via the input terminal 6d to rewrite its own count value.

The operation of the apparatus thus configured will be now described. It is here assumed that an automotive vehicle is advancing in a straight line, and the rotary disk 1 rotating in cooperation with the steering is positioned at the rotation center as shown in FIG. 1. At this time, the count value of the UP/DOWN counter 6 must be equal to zero in fact. In the prior art, however, there is the possibility that the count value is different from zero due to electric noises or rotation of the steering wheel after the ignition switch has been turned off. When such a count value which is different from zero is input to the decoder 8, the irradiation direction of the head lamp which is controlled by the output of the decoder 8 is deviated from the required one in correspondence with the count value. However, according to this embodiment of the present invention, it is possible to control correctly the irradiation direction of the head lamp in cooperation with the steering because of the corrective operation described later.

More of running paths for automotive vehicles are straight paths and there is no possibility that an automotive vehicle travels for a long time with the steering wheel being rotated in a 360-degree arc. Namely, even when the steering wheel is steered in a 360-degree arc from the steering center, the time period during which the original position detection signal is produced is short and the steering wheel is returned to the vicinity of the steering center after the automotive vehicle has traveled for a short time. In accordance with the inventor's investigation under the condition where an automotive vehicle is caused to actually run, it has been experimentally confirmed that time required for returning the steering wheel which has been rotated in a 360 degree on an U-turn road etc. to the vicinity of the steering center is less than 30 seconds. Namely, within 30 seconds after the original position detection signal has been produced at a position where the steering wheel is rotated in a 360-degree arc, steering more than 180 degrees in terms of the rotational angle is necessarily conducted. In other words, unless steering more than 180 degrees is conducted within 30 seconds after the original position detection signal has been produced, it may safely be said that the original position at that time is judged as the rotation center position.

It is now assumed that the R-S flip-flop 11 and the frequency divider 13 are in initial reset state and an original position detection signal has been produced at the rotation center of the rotary disk 1 (FIG. 1). At this time, the level of the input terminal 10a of the AND circuit 10 is "H". Since the $\overline{Q}$ output of the R-S flip-flop 11, i.e., the signal of "H" has been already input to the input terminal 10b of the AND circuit 10, the output level of the AND circuit 10 goes "H" to reset the UP/-DOWN counter 7, causing the count value to be equal to zero, and to set the R-S flip-flop 11. Thus, the levels of the Q and $\overline{Q}$ outputs of the R-S flip-flop 11 become "H" and "L", respectively. When the level of the $\overline{Q}$ output of the R-S flip-flop 11 is inverted to "L", the gate of the AND circuit 10 is closed. When the level of the Q output thereof is inverted to "H", the gate of the AND circuit 12 is opened. Accordingly, the clock pulse signal output from the reference clock generator 14 passes through the AND circuit 12 and begins to be input to the frequency divider 13. At this time, since the count value of the UP/DOWN counter 7 has been reset to zero and this value of zero falls within the range of the reference count values $\pm\chi$, the comparator 15 does not deliver a reset signal to the frequency divider 13, so that the frequency divider 13 continues the frequency dividing operation of the clock pulse signal input from the AND circuit 12. This frequency dividing operation is continuously carried out not only in the case where the count value of the UP/DOWN counter 7 is zero but also within the count values of $\pm\chi$. Namely, in the case of steering within rotational angles of $\pm 180$ degrees with the steering center being as the center, the comparator 15 does not output the reset signal, so that the frequency dividing operation at the frequency divider 13 continues. When 30 seconds have elapsed under such a condition, the frequency divider 13 overflows, so that the load signal is output to the UP/DOWN counter 6. Thus, the UP/DOWN counter 6 receives the load signal to take inthe count value at the present time of the UP/DOWN counter 7 to rewrite the count value. Namely, when the rotary disk 1 is positioned at the rotation center at this time, the count value of the UP/-DOWN counter 7 is equal to zero. This count value is transferred to cause the count value of the UP/DOWN counter 6 to set equal to zero. When the rotary disk 1 is not positioned at the rotation center at this time, but its rotational angle falls within the angular range of $\pm 180$ degrees, the UP/DOWN counter 7 effects a precise count to make the count value at the rotation center zero. This count value is transferred to the UP/DOWN counter 6. Even if the UP/DOWN counter 6 is erroneously effecting count operation, the precise count value with the rotation center being as reference is taken into the UP/DOWN counter 6, so that accurate correction is made. The load signal output from the frequency divider 13 is input to the R terminal of the flip-flop 11 through the OR circuit 16 to place the R-S flip-flop 11 in reset state, thus to stand by occurrence of the next original position detection signal.

The operation after the original position detection signal has been produced at the going-straight steering position has been described. In addition, during running of an automotive vehicle, the original position detection signal will be produced also when the steering wheel is rotated in a 360-degree arc. It is now assumed that the R-S flip-flop 11 and the frequency divider 13 are in initial reset state, and the steering wheel is rotated in a 360-degree arc from the steering center, so that an original position detection signal is produced. At this time, the level of the input terminal 10a of the AND circuit 10 goes "H" in the same manner as stated above. As a result, the count value of the UP/DOWN counter 7 becomes equal to zero, and a clock pulse signal output from the reference clock generator 14 begins to be input to the frequency divider 13. At this time, since the count value of the UP/DOWN counter 7 is equal to zero, and this count value of zero is within the range of reference count values $\pm\chi$, the comparator 15 does not output a reset signal to the frequency divider 13, with the result that the frequency dividing operation at the frequency divider 13 is continuously carried out. However, a time required for returning the steering wheel from the position where the steering wheel is rotated in a 360-degree arc to the vicinity of the steering center is less than 30 seconds as previously described. Accordingly, the UP/-DOWN counter 7 effects a count equivalent to more than 180 degrees in terms of the rotational angle of the steering wheel within 30 seconds, so that the count value is out of the range of reference count values $\pm\chi$. At this time, the comparator 15 outputs a signal of "H" to reset the frequency divider 13. In this instance, the rest signal is input to the frequency divider 13 within 30 seconds after the clock pulse signal begins to be input to the frequency divider 13. Accordingly, the frequency divider 13 is reset before the clock pulse signal overflows, so that the load signal is not supplied to the UP/-DOWN counter 6. Namely, the count value of the counter 7 at this time is equivalent to a count value obtained when the original position in a clockwise or counterclockwise direction is assumed to be the rotation center. There is no possibility that this count value is used to correct the count value of the UP/DOWN counter 6. The reset signal output from the comparator 15 is also input to the R terminal of the R-S flip-flop 11 through the OR circuit 16 to place this flip-flop 11 in reset state, thus to stand by occurrence of the next original position detection signal.

As described above, in accordance with the apparatus according to this embodiment, the UP/DOWN counter 7 performs a count operation under condition where each original position is assumed to be a virtual rotation center. Since the count value transferred to the UP/-DOWN counter 6 is really equivalent to a count value corresponding to the true rotation center, precise and accurate correction is made using this count value, thus making it possible to control the irradiation direction of the head lamp without hindrance in cooperation with the steering. In addition, after an original position detection signal is produced once at the rotation center, even if steering is conducted thereafter (within the range of $\pm 180$ degrees), the correction of the count operation of the UP/DOWN counter 6 is accurately performed, and even when a vehicle is running on a curved road, the correction of the operation for changing the irradiation direction is securely conducted.

FIG. 3 is a block diagram illustrating another embodiment of a rotation center determining apparatus according to the present invention. In FIG. 3, the same components as those in FIG. 1 are designated by the same reference numerals, respectively. The arrangement in FIG. 3 is the same as that in FIG. 1 except for the following points.

A reference count to be set in advance in the comparator 17 is zero (which will be referredto as "No" hereinafter). When a signal of "H" is input to an enable terminal 17c of the comparator 17, the comparator 17 takes in a count value of the UP/DOWN counter 7 at the present time to compare it with the reference count value No. As a result, when the count value thus taken in is not equal to the reference count value No, the comparator 17 outputs a reset signal from an output terminal 17b to the frequency divider 13. The enable terminal 17c of the comparator 17 is connected to the output terminal of the AND circuit 18 having one input terminal to which an original position detection signal is input, and the other input terminal to which Q output of the R-S flip-flop 11 is input.

The operation of the circuit shown in FIG. 3 will be now described.

It is now assumed that the R-S flip-flop 11 and the frequency divider 13 are in initial reset state, the steering wheel is positioned at the center thereof, and an original position detection signal ("H") is input to the AND circuits 10 and 18. Since $\overline{Q}$ output of the R-S flip-flop 11, i.e., a signal of "H" has been already input to the other input terminal of the AND circuit 10, the output level of the AND circuit 10 becomes "H" to reset the UP/DOWN counter 7 and to place the R-S flip-flop 11 in set state. Thus, the count value of the UP/DOWN counter 7 becomes equal to zero, and levels of the Q and $\overline{Q}$ outputs of the R-S flip-flop 11 become "H" and "L", respectively. As a result, the gate of the AND circuit 10 is closed, whereas the gates of the AND circuits 12 and 18 are opened. Thus, the clock pulse signal begins to be delivered from the reference clock generator 14 to the frequency divider 13, and the level of the enable terminal 17c of the comparator 17 becomes "H". As a result, the count value at the present time of the UP/DOWN counter 7, i.e., "zero" is taken into the comparator 17 and then is compared with the reference value No. In this instance, since both the values are equal to each other, the comparator 17 does not output a reset signal to the frequency divider 13. The frequency divider 13 continuously carries out the frequency dividing operation of the clock pulse signal input. The frequency dividing operation at the frequency divider 13 is performed as described in the embodiment in FIG. 1. Namely, in the case where no original position detection signal is produced, since comparative operation itself at the comparator 17 is not conducted, there is no possibility that the reset signal is output to the frequency divider 13. Namely, after the original position detection signal has been produced once at the rotation center, the frequency dividing operation at the frequency divider 13 is continuously carried out even if the original position detection signal had not continued to be produced. When 30 seconds has passed under such a condition, an overflow occurs at the frequency divider 13, so that the load signal is output to the UP/DOWN counter 6. Thus, the UP/DOWN counter 6 receives the load signal to take in a count value at the present time of the UP/DOWN counter 7 to rewrite the count value. Namely, at this time, if the rotary disk 1 is positioned at the rotation center, the count value of the UP/DOWN counter 7 is equal to zero. This count value is transferred, so that the count value of the UP/DOWN counter 6 becomes zero. In contrast, in the case where the rotary disk 1 is not positioned at the rotation center at this time and has made a rotation (within ±1 rotation), a precise count with the rotation center being as reference is being conducted at the UP/DOWN counter 7, and this count value is transferred to the UP/DOWN counter 6. Namely, even if the UP/DOWN counter 6 has erroneously effected count operation, the precise count value with the rotation center being as reference is taken into the UP/DOWN counter 6, so that accurate correction is conducted. The load signal output from the frequency divider 13 is also input to the R terminal of the R-S flip-flop 11 through the OR circuit 16 to place the R-S flip-flop 11 in reset state, thus to stand by occurrence of the next original position detection signal.

The operation after the original position detection signal has been produced at the center of the steering wheel has been described. During running of an automotive vehicle, an original position detection signal is produced also in the clockwise or counterclockwise original position. It is now assumed that R-S flip-flop 11 and the frequency divider 13 are in initial reset state, and an original position detection signal has been produced in the clockwise or counterclockwise original position. At this time, the original position detection signal of "H" is input to the AND circuits 10 and 18 in the same manner as stated above. Thus, the count value of the UP/DOWN counter 7 becomes equal to zero and the clock pulse signal output from the reference clock generator 14 begins to be input to the frequency divider 13. At this time, the comparator 17 takes in the count value of the UP/DOWN counter 7 and compares it with the count value No. Since the count value of the counter 7 has been already equal to zero at that time, it becomes equal to the reference value No, so that the frequency divider 13 continuously effects frequency dividing operation without being subjected to reset. However, since a time required for returning the steering wheel from the clockwise or counterclockwise original position to the center of the steering wheel is less than 30 seconds as previously described, the original position detection signal produced at the rotation center within this time period of 30 seconds enables the comparator 17b via the AND circuit 18. At this time, the count value of the UP/DOWN counter 7 taken into the comparator 17 is equal to a count value correspoonding to one rotation with the clockwise or counterclockwise original position being set to zero, which is not equal to the reference count value No. Accordingly, the comparator 17 outputs a signal of "H" at this time to reset the frequency divider 13. Accordingly, the frequency divider 13 is reset before its overflows. As a result, since the load signal is not output to the UP/DOWN counter 6, no correction of the count value at the UP/DOWN counter 6 is made. The reset signal output from the comparator 17 is also input to the R input terminal of the R-S flip-flop 11 to place this R-S flip-flop 11 in reset state to stand by occurrence of the next original position detection signal.

As described above, in accordance with the apparatus according to this embodiment, the UP/DOWN counter 7 performs a count operation under condition where each original position is assumed to be a virtual rotation center. Since the count value transferred to the UP/DOWN counter 6 is really equivalent to a count value corresponding to the true rotation center, precise and accurate correction is made using this count value, thus making it possible to control the irradiation direction of the head lamp without hindrance in cooperation with the steering. In addition, after an original position detection signal is produced once at the rotation center, even if steering is conducted thereafter (within the range of ±180 degrees), the correction of the count operation of the UP/DOWN counter 6 is accurately performed, and even when a vehicle is running on a curved road, the correction of the operation for changing the irradiation direction is securely conducted.

In the above-mentioned two embodiments, the setting has been made such that the frequency dividing ratio of the frequency divider 13 is equal to 30 secondsin terms of time, but it is not limited that a time corresponding to the frequency dividing ratio is necessarily equal to 30 seconds. It is needless to say that a time corresponding to the frequency dividing ratio may be set to an arbitrary time more than a time required for securely returning the steering wheel from the clockwise or counterclockwise original position to the center of the steering wheel. Explanation has been made in connection with the corrective operation of the counter in the system to change the irradiation direction of the head lamp in cooperation with the steering, which is so called "cornering lamp system". In addition, correction of the counter in other systems to control the steering action in cooperation with the steering may be made. This invention is not limited to the application to such a correction of the counter, but can also determine the rotation center of a rotary body rotating in cooperation with an external operation. By using the rotation center thus determined as reference, various controls may be conducted, resulting in extremely high utility.

As stated above, this embodiment makes it possible to determine, as the rotation center of a rotary body, an original position obtained when other original positions cannot be detected by the time a predetermined time elapses among original positions taken per each rotation of the rotary body. For instance, in the case of rotating this rotary body in cooperation with a steering wheel for an automotive vehicle etc., it is possible to accurately judge the going-straight steering position. Thus, correction of an erroneous count of the counter in the rotational position sensor can be made at the time of the judgement of the going-straight steering position.

Figure 4:
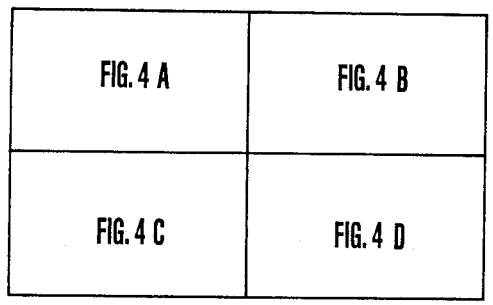

FIG. 4 is a block diagram illustrating a further embodiment according to the present invention wherein the present invention is applied to the cornering system for a vehicle. As shown in this figure, the apparatus according to this embodiment includes a steering sensor 19 which outputs an analog voltage signal as shown in FIG. 5(a) in cooperation with the steering in a clockwise direction and a counterclockwise direction, a processing circuit 20 which processes the analog voltage signal output from the steering sensor 19, and a power supply 21.

The steering sensor 19 is of the wiper contact type. In variable resistor 191, terminal 194 is grounded and terminal 192 is connected to a constant voltage power supply 210. An intermediate terminal 193 is connected with a slide contact member which is endlessly rotatable with the steering wheel while it maintains contact with the resistor 191. The steering sensor 19 is configured so that, when the steering wheel is at the going-straight steering position, a divided voltage (analog voltage signal) appearing on the intermediate terminal 193 is approximately equal to one half of a voltage across both terminals of the variable resistor 191 through the constant voltage power supply 210. The analog signal voltage appearing on the output terminal 193 of the steering sensor 19 is input to respective inverting input terminals of comparators 221 and 222 provided in the processing circuit 20. A setting is made such that this voltage is equal to Vo at the time of the going-straight steering. Further, settings are made such that a voltage appearing on the non-inverting input terminal of the comparator 221 is equal to a reference voltage V2 determined by resistors R1 and R2, and a voltage appearing on the non-inverting input terminal of the comparator 222 is equal to a reference voltage V1 determined by resistors R3 and R4. In this embodiment, setting are made such that the reference voltage V1 is larger than the above average V0 by a value corresponding to a steering rotational angle of plus (+) 60 degrees and the reference voltage V2 is smaller than the above voltage V0 by a value corresponding to a steering rotational angle of minus (−) 60 degrees. Outputs from the comparators 221 and 222 are input to input terminals 230A and 230B of a decoder 230, respectively. When signals of "L" are input to respective input terminals 230A and 230B, the level of an output terminal 230a of the decoder 230 becomes "H". When signals of "L" and "H" are input thereto, the level of an output terminal 230b thereof becomes "H". In addition, when signals of "H" are input thereto, the level of an output terminal 230c becomes "H".

The output terminal 230a of the decoder 230 is connected to a set terminal of a R-S flip-flop 241 and a reset terminal of a R-S flip-flop 243. When the level of the output terminal 230a becomes high, a one shot multivibrator 253 outputs a signal to the input terminals of AND circuits 262 and 265 for a predetermined amount of time. The output terminal 230b of the decoder 230 is connected to a reset terminal of the R-S flip-flop 241 and a set terminal of a R-S flip-flop 242. When the level of the output terminal 230b becomes "H", an one shot multivibrator 252 continues to output an one shot signal to one input terminals of AND circuits 263 and 266. In addition, the output terminal 230c of the decoder 230 is connected to a reset terminal of the R-S flip-flop 242 and a set terminal of the R-S flip-flop 243. When the level of the output terminal 230c becomes high, a one shot multivibrator 251 outputs a signal to the input terminals of the AND circuits 261 and 264.

Moreover, Q and $\bar{Q}$ outputs from the R-S flip-flop 241 are input to the other input terminals of the AND circuits 261 and 264, respectively. Likewise, Q and $\bar{Q}$ outputs from the R-S flip-flop 242 are input to the other input terminals of the AND circuits 262 and 265, respectively. In addition, Q and $\bar{Q}$ outputs from the R-S flip-flop 243 are input to the other input terminals of the AND circuits 263 and 266, respectively. Outputs from the AND circuits 261 to 263 are input to a three-input OR circuit 271, and outputs from the AND circuit 264 to 266 are input to a three-input OR circuit 272. Outputs from the OR circuits 271 and 272 are input to up and down input terminals 270u and 270d of an UP/DOWN counter 270, respectively. The UP/DOWN counter 270 effects up or down count every time a signal of "H" is input to the input terminal 270u or 270d to output a digital signal corresponding to the count value to decoders 280 and 290. These decoders 280 and 290 decode this digital signal to select predetermined output terminals from the output terminals 280a to 280i and 290a to 290o depending upon the decoded results, thus setting their levels to "L" and "H". Namely, a setting is made such that the count value of the UP/DOWN counter 270 is equal to zero at point N in FIG. 5(a). At this time, the decoders 280 and 290 select output terminals 280e and 290h, thus allowing their levels to be "L" and "H", respectively. Every time the UP/DOWN counter 270 counts up by one, the decoder 280 shifts upward the position of an output terminal of which level is to be set to "L" from the output terminal 280e in order of 280d, 280c . . . 280a, and the decoder 290 shifts upwards the position of an output terminal of which level is to be set to "H" from the output terminal 290h in order of 290g, 290f . . . 290a.

In contrast, every time the UP/DOWN counter 270 counts down by one from zero, the decoder 280 shifts downwards the position of an output terminal level of which is to be set to "L" from the output terminal 280e in order of 280f, 280g . . . 280i, and the decoder 290 shifts downward the position level of which is to be set to "H" from the output terminal 290h in order of 290i, 290j . . . 290o. It is needless to say that output terminals respective levels of which are set to "L" and "H" of the decoders 280 and 290 are shifted upwardly or downwardly to the adjacent output terminal. The output terminals 280a to 280d is connected commonly to the output terminal 20a of this processing circuit 20 through an inverter 291 and the output terminals 280f to 280i thereof is connected commonly to the output terminal 20b through an inverter 292. The output terminals 20a and 20b are connected to a lamp driver, not shown, which varies irradiation directions of right and left lamps provided at the front surface of the vehicle.

When the level of the output terminal 20a becomes "H", the irradiation direction of the right lamp is rotationally changed in the right direction, and when the level of the output terminal 20b becomes "H", the irradiation direction of the left lamp is rotationally changed in the left direction.

The output terminals 290a to 290g and 290i to 290o of the decoder 290 are connected to one input terminals of the AND circuits 293a to 293g and 293i to 293o, respectively. The output terminal 230b of the decoder 230 is connected to the other input terminals of the AND circuits 293a to 293d, 293f, 293g, 293i, 293j and 293l to 293o. Output terminals 290d, 290f, 290g, 290i, 290j and 290l of the decoder 290 are branched and the branched terminals are connected to one input terminals of AND circuits 293p, 293q, 293r, 293s, 293t and 293u, respectively. Output terminals of AND circuits 293a to 293d, 293f, 293g, 293i, 293j, and 293l to 293o are connected to set terminals of R-S flip-flops 294a to 294d, 294e, 294f, 294g, 294h, and 294i to 294l, respectively. Q output terminals of the R-S flip-flops 249a, 294b and 294c are connected to the other input terminals of the AND circuits 293p, 293e and 293q, respectively. Q output terminals of the R-S flip-flops 294j, 294k and 294l are connected to the other input terminals of the AND circuits 293t, 293k and 293u, respectively. To the other input terminals of the AND circuits 293r and 293s, output terminals of three-input AND circuits 295 and 296 are connected, respectively. To input terminals of three-input AND circuits 295 and 296, output terminals of the R-S flip-flops 294d, 294f and 294h, and 294e, 294g and 294i are connected, respectively. Output terminals of the AND gates 293p, 293e, 293q, 293r, 293s, 293t, 293k and 293u are connected to respective input terminals of an eight-input OR circuit 297. When the output level of the OR circuit 297 becomes "H", the one shot multivibrator 254 continues to output an one shot signal of "H" to the UP/DOWN counter 270 and the one shot multivibrator 255 for a predetermined time. Thus, the count value of the UP/DOWN counter 270 is reset and is returned to zero. The multivibrator 255 operates in response to the fall edge of the input one shot signal to output an one shot signal of "H" to the reset terminals R of the R-S flip-flops 294a to 294l.

The operation of the cornering lamp system for vehicle thus configured will be now described. It is now assumed that an automotive vehicle advances in a beeline and the steering wheel is positioned at the center thereof (point N in FIG. 5(a)). At this time, the count value of the UP/DOWN counter 270 is equal to zero. In the decoder 280, only the level of the output terminal 280e represents "L" and the levels of output terminals 280a to 280d and 280f to 280i represent "H". Accordingly, output levels of the output terminals 20a and 20b of the processing circuit 20 become "L" because of inversion by the inverters 291 and 292. As a result, the irradiation directions of the right and left lamps are not changed with they being directed to the front. At this time, since the output voltage of the steering sensor 19 is equal to VO, the output levels of the comparators 221 and 222 represent "L" and "H", respectively. Among the output terminals 230a, 230b and 230c of the decoder 230, only the level of the output terminal 230b represents "H". Thus, the R-S flip-flops 241 and 242 are reset and set, respectively. As a result, the level of $\overline{Q}$ output of the R-S flip-flop 241 and the level of Q output of the R-S flip-flop 242 both become "H". These outputs of "H" are input to the AND circuits 264 and 262, respectively.

From such a condition, when the steering wheel is rotated to the right to initiate the clockwise or right steering, the steering rotational angle is increased in a positive direction, so that an analog signal voltage gradually increases. Thus, when the steering rotational angle becomes plus (+) 60 degrees, the voltage of the analog signal becomes V1, so that the output level of the comparator 222 is inverted from "H" to "L" (point a in FIG. 5(c)). Thus, both the outputs of the comparators 221 and 222 become "L". As a result, an output terminal to be set to "H" is shifted upwardly from the output terminal 230b to the output terminal 230a. Thus, the R-S flip-flop 241 is set and a signal of "H" is input to the multivibrator 253. As a result, the multivibrator 253 outputs an one shot signal of "H" to the AND circuts 262 and 265. On the other hand, the R-S flip-flop 242 maintains Q output level of "H" after the signal of "H" to its set terminal has disappeared. Since two inputs of the AND circuit 262 become "H", its output level becomes "H". As a result, the output level of the OR circuit 271 becomes "H", so that the UP/DOWN counter 270 counts up by one. Then, the decoder 280 outputs, from the output terminal 280d, a signal of "L" which has been output from the output terminal 280e until now. As a result of inversion of the signal of "L" by the inverter 291, the level of the output terminal 20a of the processing circuit 20 becomes "H" (point a in FIG. 5(d)). Thus, the irradiation direction of the right lamp is changed in the right direction.

When the clockwise steering is further continued after such a condition has been realized, the output voltage of the steering sensor 19 further increases. At point b in FIG. 5(a) where the steering rotational angle is equal to plus (+) 180 degrees, its level is down from the maximum voltage Vmax to the minimum voltage Vmin. (This corresponds to the point when the wiper returns to terminal 194 from terminal 192.) Thus, the output level of the comparator 221 is inverted from "L" to "H" (point b in FIG. 5(b)) and the output level of the comparator 222 is also inverted from "L" to "H" (point b in FIG. 5(c)). Accordingly, an output terminal from which a signal of "H" is output of the decoder 230 is shifted downwardly from the output terminal 230a to 230c. Thus, the R-S flip-flop 243 is set and the multivibrator 251 begins outputting an one shot signal of "H" to the AND circuits 261 and 264. On the other hand, since the R-S flip-flop 241 maintains Q output level of "H" after the signal of "H" to its set terminal has disappeared, the AND circuit 261 outputs an output of "H". As a result, the output level of the OR circuit 271 becomes "H", so that the UP/DOWN counter 270 counts up further by one. Thus, the decoder 280 outputs from the output terminal 280c the signal of "L" which has been output from the output terminal 280d until now. When the steering rotational angle reaches plus (+) 300 degrees (point c in FIG. 5(a)), the output levels of the comparators 221 and 221 becomes "L" and "H", respectively (point a in FIGS. 5(b) and 5(c)). Thus, the decoder 230 outputs the signal of "H" from the output terminal 230b for a second time. As a result, the output level of the AND gate 263 becomes "H", so that the UP/DOWN counter 270 counts up further by one. Namely, when the clockwise steering is continued with the steering center being as the center, output levels of the AND gates 262, 261 and 263 become "H" in turn. Thus, the UP/DOWN counter 270 counts up one by one, with the result that an output terminal from which a signal of "L" is output of the decoder 280 is shifted upward in order of the output terminals 280d, 280c ... 280a. Since these output terminals 280c to 280a are connected to the output terminal 20a through the inverter 291 in the same manner as the output terminal 280d, after the steering rotational angle has exceeded pluse (+) 60 degrees, so that the output terminal 280d of the decoder 280 has become "H", the level of the output terminal 20a maintains "H". Thus, the irradiation direction of the right lamp is fixed to a point in the steering direction.

At the time of the above-mentioned clockwise steering with the steering center being as the starting point, since the levels of the output terminals 280f to 280i of the decoder 280 represent "H", the level (FIG. 5(e)) of the processing circuit 20 continues to maintain "L". Thus, the irradiation direction of the left lamp is not changed, so that the left lamp is maintained with it being directed to the front. Namely, in the case where the clockwise steering is carried out with the steering center being as the center, only the irradiation direction of the right lamp is changed to a predetermined swing angular position on the side of the steering direction in cooperation with the steering and is fixed thereat. By this change of the irradiation direction, the field of vision on the right side at the time of cornering by the steering to the right is ensured. At this time, since the left lamp irradiates the front direction in a fixed manner, the field of vision in front of the vehicle is also ensured, thus making it possible to perform a more safe cornering to the right.

In the case of performing the counterclockwise steering with the steering center as center, at point e in FIG. 5(a), both the outputs of the comparators 221 and 222 both become "H" (point e in FIGS. 5(b) and 5(c)). Thus, an output terminal level of which is to be set at "H" of the decoder 230 is shifted downwardly from the output terminals 230b to 230c. As a result, the output level of the AND circuit 264 becomes "H", so that the count value of the UP/DOWN counter 270 is decreased by one. An output terminal level of which is to be set at "L" of the decoder 280 is shifted downwardly from the output 280e to 280f. The output terminal 20b of the processing circuit 20 becomes "H" (point e in FIG. 5(e)), so that the irradiation direction of the left lamp is changed in the left direction.

When the counterclockwise steering is further continued after such a condition has been realized, the output voltage of the steering sensor 19 further lowers, so that its voltage level rises from the minimum voltage Vmin to the maximum voltage Vmax at point f in FIG. 5(a) where the steering rotational angle is equal to minus (−) 180 degrees. Thus, both the output levels of the comparator 221 and 222 become "L" (point f in FIGS. 5(b) and 5(c)), so that an output terminal level of which is to be set at "H" of the decoder 230 is shifted upwardly from the output terminal 230c to the output terminal 230a, so that the output level of the AND circuit 265 becomes "H". As a result, the count value of the UP/DOWN counter 270 is decreased by one, so that an output terminal level of which is to be set at "L" of the decoder 280 is shifted downwardly from the output terminal 280f to the output terminal 280g. Thus, at point g in FIG. 5(a), the output levels of the comparators 221 and 222 become "L" and "H", respectively (point g in FIGS. 5(b) and 5(c)). At point h, both the output levels of the comparators 221 and 222 become "H", so that an output terminal level of which is to be set at "H" of the decoder 230 is shifted downwardly in order of the output terminals 230a, 230b and 230c. Thus, both the output levels of the AND circuits 266 and 264 become "H", thereby allowing the count value of the UP/DOWN counter 270 to be further decreased. Thus, an output terminal level of which is to be set at "L" is shifted downwardly in order of the output terminals 280g, 280h and 280i. Since the output terminals 280g to 280i are connected to the output terminal 20b through the inverter 292 in the same manner as the output terminal 280f, after the steering rotational angle has exceeded minus (−) 60 degrees, so that the output terminal 280f of the decoder 280 has become "H", the level of the output terminal 20b maintains "H". As a result, the irradiation direction of the left lamp is maintained with it being fixed to a point in the steering direction.

Since the levels of the output terminals 280a to 280d of the decoder 280 represent "H" at the time of the above-mentioned counterclockwise steering with the steering center being as the center, the output terminal 20a of the processing circuit 20 continues to maintain "L". As a result, the irradiation direction of the right lamp is not changed with it being directed to the front. Namely, in the case of effecting the counterclockwise steering with the steering center as the starting point, only the irradiation direction of the left lamp is changed to a predetermined swing angular position on the side of the left direction in cooperation with the steering and is fixed thereat. By this change of the irradiation direction, the field of vision at the time of the cornering by the counterclockwise steering is ensured. At this time, since the right lamp irradiates the front direction in a fixed manner, the field of vision in front of the vehicle is ensured, thus making it possible to perform a more safe cornering to the left.

In this embodiment, the operation in connection with the case of turning the steering wheel in the clockwise and counterclockwise has been described. Even in the case of turning in the counterclockwise direction after turning in the clockwise direction or turning in the clockwise direction after turning in the counterclockwise direction, as long as an output terminal level of which is to be set at L" of the decoder 280 is positioned at the output terminals 280a to 280d and 280f to 280i, the irradiation directions of the right and left lamps are not changed, thus maintaining fixed irradiations in the right and left directions. At the time when the count value of the UP/DOWN counter 270 is decreased, so that the decoder 280 outputs a signal of "L" from the output terminal 280e, or when the count value of the UP/DOWN counter 270 is increased, so that the decoder 280 outputs a signal of "L" from the output terminal 280e, the irradiation direction of the right lamp or left lamp is returned to the condition where it is directed to the front and the change of the irradiation direction is stopped. A basic operation of the cornering lamp system has been described.

Then, the reference will be made to the case where the count value of the UP/DOWN counter 270 is different from the true count value in the cornering lamp system. Assuming now that the steering wheel is positioned at the center thereof (rotation center), and an automotive vehicle is running straight, the count value of the UP/DOWN counter 270 must be equal to zero in face. However, there is the possibility that this count value is different from zero. If such a count value different from the true value is input to the decoder 280, there occurs an inconvenience such that the operation for changing the irradiation directions of the right and left lamps which is controlled using the decoder 280 deviates from the normal operation in correspondence with that count value. However, since corrective operation which will be described below is carried out without delay in this embodiment, it is possible to change the irradiation directions of the right and left lamps in cooperation with the steering without hindrance.

Namely, the steering wheel for an automotive vehicle ordinarily makes three or four rotations in the case of lock-to-lock. At three rotational angular positions within the range where the steering wheel of the lock-to-lock system is turnable, the decoder 230 outputs a signal of "H" from the output terminal 230b. Namely, in the range of the rotational angle of ±60 degrees of the steering wheel with the center of the steering wheel being as the starting point, and in the range of the rotational angular range of ±60 degrees with a rotational angular position (original position) being as the center, which is taken per each rotation of the steering wheel in the clockwise and counterclockwise directions with the steering center being as the starting point, the decoder 230 outputs a signal of "H" from the output terminal 230b. The count value of the UP/DOWN counter 270 is determined to be equal to zero at the steering center. According as the steering wheel is rotated in the clockwise direction, its count value increases in a positive direction, and according as the steering wheel is rotated in the counterclockwise direction, its count value increases in a negative position. Namely, a count value at the original position when the steering wheel has made one rotation in the clockwise direction is larger than a count value at the steering center, and a count value at the original position when the steering wheel has made one rotation in the counterclockwise direction is smaller than a count value at the steering center. Assuming now that a count value at the steering center is NO, a count value at the original position in the clockwise direction is NR, and a count value at the original position in the counterclockwise direction is NL, the relationship of NL<NO<NR holds. This relationship is invariant even when deviation in the count value of the UP/DOWN counter 270 occurs. Namely, the order of a count value at the steering center is such that its count value is necessarily taken between count values at the original positions in the clockwise and counterclockwise directions. Accordingly, among three original positions of the steering wheel including the steering center, an original position when the count value of the UP/DOWN counter 270 has the intermediate or central order is judged as the steering center (the rotation center).

It is now assumed that an automotive vehicle is running straight and the steering sensor 19 outputs an analog signal voltage Vo at point N in FIG. 5(a). At this time, if there is no deviation in the operation of the UP/DOWN counter 270, its count value becomes equal to zero and the level of the output terminal 290h of the decoder 290 becomes "H". At the original positions in the clockwise and counterclockwise directions of the steering wheel, the levels of the output terminals 290e and 290k become "H". However, when deviation of the count value of the UP/DOWN counter 270 occurs, the level of the output terminal 290h of the decoder 290 does not become "H". It is now assumed that deviation in the operation of the UP/DOWN counter 270 and the level of the output terminal 290g of the decoder 290 represents "H" at the steering center. As this time, the level of the output terminal 290d at the original position in the clockwise direction of the steering wheel becomes "H" and the level of the output terminal 290j at the original position in the counterclockwise direction becomes "H". When the level of the output terminal 290g becomes "H" at the steering center, since a signal of "H" (i.e., original position signal) is input to the other input terminal of the AND circuit 293g at this time, the output level of the AND circuit 293g becomes "H". Thus, the R-S flip-flop 294f is set, so that the level of its Q output becomes "H" and this output is input to the AND circuit 295. The Q output of "H" is continuously output from the R-S flip-flop 294f even when an input of "H" to its set terminal has disappeared. When the level of the output terminal 290d of the decoder 290 at the original position in the clockwise direction of the steering wheel becomes "H", the output level of the AND circuit 293d becomes "H". As a result, Q output of the R-S flip-flop 294d becomes "H" and is supplied to the AND circuit 295. Thus, when the level of the output terminal 290j of the decoder 290 becomes "H" at the original position in the counterclockwise direction, the Q output level of the R-S flip-flop 294h becomes "H", so that all input levels of the AND circuit 295 becomes "H" and the AND circuit 293r is opened. Accordingly, after the output level of the AND gate 295 has become "H", since levels of two inputs of the AND gate 293r both become "H" at the center of the steering wheel where the level of the output terminal 290g of the decoder 290 becomes "H", a signal of "H" is output from the OR gate 297, so that an one shot signal of "H" is input to the reset terminal of the UP/DOWN counter 270 through the multivibrator 254. Thus, the count value of the UP/DOWN counter 270 is forcedly returned to zero, thus allowing the levels of the output terminal 280e of the decoder 280 and the output terminal 280h of the decoder 290 to be set to "L" and "H", respectively. Namely, among original positions that the decoder 230 outputs the original position signal of "H" from the output terminal 230b, an original position such that the count value of the UP/DOWN counter 270 takes the intermediate order is selected. By using this original position as the true rotation center, correction of the count value of the UP/DOWN counter 270 is made. Subsequently thereto, the right and left lamps perform the operation for changing the normal irradiation direction. In response to fall edge of an one shot signal output from the multivibrator 254, the multivibrator 255 outputs an one shot signal of "H", thus allowing the R-S flip-flops 294d, 294f and 294h to be returned to reset state.

When the output terminals 290a, 290b or 290c of the decoder 290 becomes "H" at the original position in the clockwise direction of the steering wheel, the level of the output terminal 290d, 290e or 290f necessarily becomes "H" at the steering center of the steering wheel. Without necessity of confirmation of output state of the decoder 290 at the original position in the counterclockwise direction, corrective operation in the UP/DOWN counter 270 is conducted. Namely, when the output level of the output terminal 290a of the decoder 290 becomes "H" at the original position in the clockwise direction of the steering wheel, the Q output level of the R-S flip-flop 294a becomes "H" and this output is input to one input terminal of the AND gate 293p. In the case where the level of the output terminal 290a has become "H" at the original position in the clockwise direction, when the steering wheel is returned by one rotation in counterclockwise the level of the output terminal 290d becomes "H". At the time when the level of the output terminal 290d has become "H", both the levels of two inputs of the AND circuit 293p both become "H". As a result, the output level of the OR gate 297 becomes "H", The output signal ("H") of the OR gate 297 is input to the multivibrator 254 to cause the multivibrator 254 to output a short pulse. The short pulse from the multivibrator 254 resets the UP/DOWN counter 270. In the same manner as stated above, when the levels of the output terminals 290b and 290c at the original position in the clockwise direction become "H", the levels of the output terminals 290e and 290f become "H" at the steering center. The output levels of the AND circuits 293e and 293g become "H" at the steering center, whereby correction of the count value of the UP/DOWN counter 270 is made.

When the level of the output terminal 290o, 290n or 290m of the decoder 290 becomes "H" at the original position in the counterclockwise direction of the steering wheel, the level of the output terminal 290l, 290k or 290j necessarily becomes "H" at the center of the steering wheel. Without necessity of confirmation of output state of the decoder 290 at the original position in the clockwise direction, corrective operation in the UP/DOWN counter 270 is made in the same manner stated above. In addition, when the level of the output terminal 290l, 290i or 290f becomes "H" at each original position, the output level of the AND circuit 296 becomes "H". At the time when the signal of "H" begins to be output from the output terminal 290i, the output level of the AND gate 293s becomes "H", whereby correction of the counted value of the UP/DOWN counter 270 is made.

As described above, the cornering lamp system according to this embodiment can securely detect the going-straight steering position in a short time, and can accurately make a correction of the operation for changing the irradiation direction in the transient running mode where the steering wheel is rotated by a large steering angle in a low speed condition, e.g., putting a vehicle into a garage, change of direction and moving a vehicle in its width direction etc., or in the special running mode, e.g., on a mountain path where tight corners are contigurous.

In this embodiment, it has been described that the steering wheel for an automotive vehicle makes three or four rotations in the case of lock-to-lock and the steering wheel takes three original positions including the steering center in the range where the steering wheel of the lock-to-lock type is rotatable. However, the present invention is applicable to the steering having a broder rotatable range. In this case, it is needless to say that it is the irredusible minimum of a demand that the steering wheel takes an odd number of different original positions including the steering center. In addition, while the steering sensor 19 outputs an analog signal voltage in cooperation with the steering in this embodiment, it is of course that the sensor output is not limited to the analog signal voltage and such a processing may be performed on the basis of an output from a sensor of the digital type.

What is claimed is:

1. A device for determining a rotational angular center of a rotary body rotating in cooperation with a steering wheel of a vehicle, said rotary body having a rotational angular position defined to be a rotational angular center when said vehicle is traveling in a straight line, said rotary body being free to rotate through the same amount on both the clockwise and counterclockwise sides of said rotational angular center, comprising:
   sensor means for sending the rotation of said angular rotary body;
   counter means for inputting an output from said sensor means to respectively increment and decrement counts according to the clockwise and counterclockwise rotations of said rotary body through a complete revolution;
   first decoder means for decoding a count value output from said counter means to output the decoded count value as rotational angular information;
   second decoder means provided with a first output terminal and a plurality of secondary output terminals for decoding said count value output from said counter means to output the decoded count value thereof from said first output terminal and said secondary terminals, said decoded count value being output on one of said secondary terminals when said output from said counter means is different from zero; and
   logic circuit means which is inoperative when a signal output of high level appears at said first output terminal and which produces a signal for resetting said counter means when a logic signal output appears at any one of said secondary output terminals.

* * * * *

UNITED STATES PATENT AND TRADEMARK OFFICE
CERTIFICATE OF CORRECTION

PATENT NO. : 4,860,601
DATED : 8/29/89
INVENTOR(S) : Shibata et al.

It is certified that error in the above-identified patent and that said Letters Patent is hereby corrected as shown below:

| | | |
|---|---|---|
| col. 01, line 14 | delete "venhicle" | insert --vehicle-- |
| col. 02, line 51 | delete "amngular" | insert --angular-- |
| col. 03, line 12 | delete "apparaus" | insert --apparatus-- |
| col. 04, line 08 | after "terminal" | insert --$\overline{Q}$-- |
| col. 05, line 39 | delete "inthe" | insert --in the-- |
| col. 08, line 39 | delete "correspoonding" | insert --corresponding-- |
| col. 09, line 05 | delete "secondsin" | insert --seconds in-- |
| col. 10, line 07 | delete "average" | insert --voltage-- |
| col. 11, line 44 | delete "249a" | insert --294a-- |
| col. 13, line 31 | delete "pluse" | insert --plus-- |

Signed and Sealed this

Twenty-second Day of October, 1991

Attest:

HARRY F. MANBECK, JR.

*Attesting Officer*     *Commissioner of Patents and Trademarks*